(12) United States Patent
Silverman

(10) Patent No.: US 7,454,350 B2
(45) Date of Patent: *Nov. 18, 2008

(54) METHODS FOR EVALUATING NEAR-TERM SUICIDAL RISK USING VOCAL PARAMETERS

(76) Inventor: Stephen E. Silverman, deceased, late of Wilton CT (US); by Marilyn K. Silverman, legal representative, 186 Old Ridgefield Rd., Wilton, CT (US) 06897

( * ) Notice: Subject to any disclaimer, the term of this patent is extended or adjusted under 35 U.S.C. 154(b) by 0 days.

This patent is subject to a terminal disclaimer.

(21) Appl. No.: 11/440,221

(22) Filed: May 24, 2006

(65) Prior Publication Data

US 2007/0233498 A1     Oct. 4, 2007

Related U.S. Application Data

(62) Division of application No. 09/935,294, filed on Aug. 22, 2001, now Pat. No. 7,062,443.

(60) Provisional application No. 60/226,950, filed on Aug. 22, 2000.

(51) Int. Cl.
*G10L 21/00*     (2006.01)
(52) U.S. Cl. .................. 704/274; 704/200; 704/209
(58) Field of Classification Search ............... 704/274, 704/200, 209, 270, 205, 207, 272
See application file for complete search history.

(56) References Cited

U.S. PATENT DOCUMENTS 6,006,188 A * 12/1999 Bogdashevsky et al. ...... 704/270
6,151,571 A * 11/2000 Pertrushin ................... 704/209

* cited by examiner

*Primary Examiner*—Huyen X. Vo
(74) *Attorney, Agent, or Firm*—Charles N. Quinn; Fox Rothschild LLP

(57) ABSTRACT

A method for evaluating near-term suicidal risk by analysis of a series of spoken words includes converting the spoken series of words into a signal having characteristics indicative of said words as spoken, dynamically monitoring said signal to detect changes therein and identifying the person as having a relatively high near-term risk of suicide on the basis of such monitored changes in the signal relative to the speech of individuals in good mental health having no near-term suicidal risk.

7 Claims, 6 Drawing Sheets

METHODS FOR EVALUATING NEAR-TERM SUICIDAL RISK USING VOCAL PARAMETERS

CROSS-REFERENCE TO RELATED APPLICATION

This application is a divisional patent application of U.S. patent application Ser. No. 09/935,294 filed Aug. 22, 2001 entitled "METHODS AND APPARATUS FOR EVALUATING NEAR-TERM SUICIDAL RISK USING VOCAL PARAMETERS", which claimed the benefit of U.S. provisional patent application Ser. No. 60/226,950 filed Aug. 22, 2000.

BACKGROUND

1. Field of the Invention

This invention relates generally to psychiatry and psychology and specifically to detection and evaluation of individuals having near-term suicidal risk, to facilitate treatment of such individuals and to prevent suicide.

2. Description of the Prior Art

Current techniques for assessing suicidality in patients include clinical interviews, history-taking, assessment of current stressors and family evaluations. Structured questionnaires, such as Beck Inventories, are used as well as nonstructured projective psychological tests.

Paradoxically, optimal assessment of risk calls for extremely time-consuming integration of relevant information from numerous sources by experienced clinicians and/or crisis teams in situations usually requiring immediate judgments so that patient protection and support can be provided. While brief screening methods and scales are available, they rely heavily on known demographic, historic and diagnostic risk factors derived from epidemiological studies which may have limited specificity and utility in prediction of near-term suicidal risk.

Authorities on the front-line, namely clinical family practitioners, police, nurses, crisis/hot-line volunteers and first year residents in non-teaching hospitals or outside teaching hospital settings, are repeatedly called on to make rapid judgments involving responsibility for identifying persons at risk for suicide. This is despite their limited access to the most relevant information and being without sufficient knowledge, training or access to more experienced clinicians. There are times when an individual, such as a police officer, has little else but the heard voice of the patient to tell him or her what action the speaker patient intends.

There is a pressing need to identify characteristics of individuals in near-term suicidal states. Suicidologists have recognized the need for investigation of state-dependent features of mental illness in order to improve near-term prediction and specificity of prediction of suicidality.

Suicidal persons' communications may take the form of direct admissions of intent, denials, ambiguous complaints or apparently superficial chat. Too often these communications fail to signal the extent of the danger. Results of psychological autopsies reveal that from forty (40) to sixty (60) percent (%) of patients who completed suicide had consulted a physician within the prior month and had communicated suicidal thinking to friends and family.

Most people who kill themselves have recently told others or intimated what they were thinking of doing. Such communications may be straightforwardly direct or may be more subtle, namely cloaked in somatic complaints or making only general reference to frustration and distress. In such cases, what is said diverts the listener from the emotional state of the speaker and is not heard effectively by the listeners in whom the suicidal person confides.

Historically, psychoanalysts and psychodynamic psychotherapists have been concerned with the ways psychological states can be communicated by vocal behavior independent of content. The necessity of "listening with the third ear" is a well-established principle in clinical evaluation and psychotherapy. This form of listening requires a special quality of attention, so that the clinician is alert not only to unconscious and preconscious verbal meanings but also to emotional resonances and predispositions to certain types of behavior. A clinician's attunement to these paralinguistic communications is essential to rapport and empathy with the patient, to facilitate timely intervention. A recognized analogy for this exchange is a mother's responsiveness to different internal states conveyed by her infant through changes in the infant's cries and other vocalizations.

This special form of listening requires an awareness in the clinician of his own defense-driven efforts to not hear and to ignore emotional meanings encoded in patients' non-linguistic expressions. This need not to hear, while accented in the therapeutic situation, is ubiquitous in human interchange and assumes a special significance when listening for suicidality. Vocalizations in danger situations are biologically programmed to elicit responses of rescue and support by the listener. However, suicidal speech often triggers a need in the listener not to hear the communication of end stage despair. This maladaptive response may arise in part from an unconscious collusion with a patient's conviction that he is already terminal and beyond the reach of intervention.

Other factors may block effective listening. People differ widely in their sensitivity to the attributes of pitch, prosody and voice quality, all of which are involved in the detection of emotional cues in speech in general and in suicidal speech in particular. Musicians typically demonstrate the auditory acuity and differentiation required to bring information about effect or vocal signatures into the foreground; other groups of people may not have such auditory acuity.

Numerous studies have correlated suicide attempts and completed suicides with depressive disorders. While early studies indicated that clinical depression may substantially increase the probability of completed suicide, later studies provided statistics indicating that high suicide risk and rates, unlike originally assumed, was not to be equated with affective disorder but could be found in an otherwise heterogeneous group of psychiatric patients. These studies further showed that in depressed patients the overall severity of depression did not differentiate between suicide attemptors and non-attemptors, suggesting that some other, additional factor(s) were involved in determining suicide risk.

Studies of the vocal parameters associated with psychomotor retardation have documented the "loss of power over the course of an utterance" and "talking down the breathstream" as being synonymous with increases in duration of pauses.

Monopitch and monoloudness are among the depressive parameters which have been studied as relevant to the diagnosis of depression and the measurement of a patient's improvement.

Researchers have described the reduced prosody, lack of intonation, restricted pitch patterns, narrowing in pitch range and monotonous voice quality observed in depressed persons. Over fifty years ago researchers described "leaden, expressionless" features of the voices of depressed patients.

Prior investigators have underscored the need to examine differences in the psychological structures driving vocal phenomena which appear to be very similar to each other but prove, on closer scrutiny, to be clinically and acoustically disparate as well. Studies bearing on the connection between vocal parameters and clinical states have examined differences between the flat, hollow, monotonous voice of the schizophrenic patient and a comparable vocal flatness in depressed patients. Upon closer scrutiny the depressed person's flatness was found to be reflected in pauses and loss of power over the course of sentences.

Both of these are consistent with psychomotor retardation. The voices of schizophrenic patients demonstrate a lack of emphasis which researchers have found is related to the absence of word imagery, providing a critical example of the impoverished capacity for internal representation characterized by schizophrenia.

Additional studies have found that schizophrenics with negative symptoms demonstrate a decrease in the intensity of their speech at higher harmonics. With increasing depressive symptoms, schizophrenic subjects were found to have moved from normal timbre and normal intonation to an expressionless flatness in their speech.

Still additional studies have postulated the existence of a high correlation between panic disorder and suicidality.

Researchers speculating on the promise of speech research have suggested that the only structures in humans evolved specifically for speech are small areas at relatively high levels of the central nervous system. The integration of the complex behavior of speech is, so to speak, imposed from the top. Perhaps because of this, speech is sensitive to subtle, clinically important changes in a patients state.

High near-term suicide risk has been described as a meta-critical state, self-sustaining, highly autonomous and independent of whatever originally brought it about. Researchers have observed that the whole notion of such an autonomous inner state is closely related to phenomena such as shock and anaclitic depression.

Clinicians have recommended that suicidality be formally designated as an independent entity co-morbid with a range of diagnostic groups. Some believe that assessment and treatment of suicidal persons is best conceptualized not in terms of psychiatric nosologic categories, but rather in terms of psychological pain and thresholds for enduring that pain.

Prior researchers, with the benefit of the teachings of U.S. Pat. No. 4,675,904 (issued in the name of one of the instant inventors), have stated that the most significant information relevant to both the speech characteristics of affectively disturbed patients and the individual sound characteristics (usually referred to as "timbre") of human voices is encoded in the distribution of overtones in spectral patterns and corresponding variabilities. These same researchers further state that depressive profiles rely too heavily on scalar parameters addressing speech flow, loudness or a speaker's dynamic expressions and do not tap into the temporally varying manifold timbres of human voices.

Suicidal crises during treatment and prevention efforts are often described by clinicians as the single most anxiety-increasing problem for them. Potentially dangerous for the patient and harrowing for the clinician, these episodes can compromise a clinician's judgment, undermine the foundations of a working alliance or lead both clinician and patient to violate the boundaries of treatment. In addition, knowledge of risk factors for suicide is based largely on studies that have examined the distinguishing characteristics of those people who, out of a group of individuals, kill themselves during a fixed time period, irrespective of what treatment may have been provided. Such studies actually identify factors which predict the risk of suicide in spite of treatment.

SUMMARY OF THE INVENTION

In one of its aspects this invention embraces a method for evaluating near-term suicidal risk by analysis of a series of spoken words where the method includes the steps of converting the spoken series of words into a signal having time varying amplitude indicative of energy content of the words as spoken, dynamically monitoring the signal to detect changes in energy content of the words as spoken and identifying the person as having a relatively high near-term risk of suicide if detected reduction in energy content of a series of words over the course of speaking the words exceeds that occurring in the speech of individuals in good mental health having no near-term suicidal risk.

In another of its aspects this invention embraces a method for evaluating near-term suicidal risk by analysis of a series of spoken words where the method includes converting the spoken series of words into a signal having discreet time varying amplitudes which are indicative of energy content of the words as spoken, dynamically monitoring the signal to detect commencement of the words in the series and the energy content of the words and identifying the speaker as having a relatively high near-term risk of suicide if detected energy content of the words and frequency of commencement of the words are both lower by pre-determined amounts than the occurrence of the same in the speech of individuals in good mental health having no near-term suicidal risk.

In yet another of its aspects this invention embraces a method for evaluating near-term suicidal risk by analysis of a series of spoken words where the method includes converting the spoken series of words into respective signals having time varying frequency, monitoring the signals to measure time varying frequency of the commencement of respective ones of the signals and hence of the words and identifying the person as having relatively high near-term risk of suicide if measured time varying frequency at word commencement varies less than a pre-determined amount of that in the speech of individuals in good mental health having no near-terms suicidal risk. In this aspect of this invention, the step of monitoring the signals to measure time variations may include measurements of time variations in fundamental frequency of the commencement of respective ones of the words and the identifying step may further include identifying the person as having relatively high near-term risk of suicide if measured fundamental frequency at word commencement varies less than a pre-determined amount of that in the speech of individuals in good mental health having no near-term suicidal risk.

In still another of its aspects this invention embraces a method for evaluating near-term suicidal risk by analysis of a series of spoken words independent of linguistic content where the method includes the steps of converting the series of words into a signal having time varying frequency, dynamically monitoring the signal to measure time varying frequency and computing an average value of the same and identifying the person as having relatively high near-term risk of suicide if measured average time varying frequency of the signal is lower by a pre-determined amount than in the speech of individuals in good mental health having no near-term suicidal risk.

In yet another of its aspects this invention embraces a method for evaluating near-term suicidal risk by analysis of spoken words where the method includes converting the spoken words into a signal indicative of the syntactic structure thereof, comparing the syntactic structure represented by the signal with known patterns of accepted syntax to identify whether some or all of the syntax of the spoken words fits a grammatically accepted pattern, comparing the initial amplitude of the spoken word identified as fitting the grammatically accepted pattern with amplitudes of preceding and succeeding contiguous words spoken by the person and identifying the person as having a relatively high near-term risk of suicide if the initial amplitude of the spoken words exceeds amplitude of the preceding and/or succeeding contiguous words by more than a pre-selected amount based on speech of individuals in good mental health having no near-term suicidal risk. In this aspect of the invention, the words desirably constitute a series of dialogically spoken words and the signal is most desirably an electrical signal.

In still yet another of its aspects this invention embraces a method for evaluating near-term suicidal risk by analysis of a series of spoken words by an emotionally agitated and/or depressed person where the method includes the steps of converting the spoken series of words into a signal indicative of the amplitude of the words as spoken, repeatedly dynamically monitoring the amplitude represented by the signal to detect amplitude increases over the course of several words followed by a return to the amplitude level prior to the detected amplitude increase to define a dynamic amplitude pattern and identifying the person as having a relatively high near-term risk of suicide if the defined dynamic amplitude pattern differs by more than a pre-selected amount from the dynamic amplitude patterns of individuals in good mental health having no near-term suicidal risk.

A still yet additional aspect of the invention embraces a method for evaluating near-term suicidal risk by analysis of a series of spoken words where the method includes converting the spoken series of words into a signal indicative of the rhythmic structure of the spoken words, dynamically monitoring the signal to detect changes in the rhythm of the speech of the person followed by a return to the determined rhythmic structure, and identifying the person as having a relatively high near-term risk of suicide if detected changes in the speech rhythm of the person repeatedly occur more often than in speech of individuals in good mental health having no near-term suicidal risk.

In still yet another one of its aspects this invention embraces a method for evaluating near-term suicidal risk by analysis of a series of spoken words where the method includes converting the spoken series of words into a signal having time varying amplitude indicative of energy content of the words as spoken, dynamically monitoring the signal to detect changes in energy content of the words as spoken and identifying the person as having a relatively high near-term risk of suicide if the combination of detected intonal increase in energy content and terminal decrease in energy content of the words as spoken exceeds that occurring in the speech of individuals in good mental health having no near-term suicidal risk.

The methods of the invention may further embrace as an additional step, even increasing accuracy in the evaluation of the presence of near-term suicidal risk in a person targeted for an assessment of suicidality, where a spoken series of words is converted into a signal which is dynamically monitored to detect presence therein of parameters conventionally indicating anxiety in the speaker and thereafter identifying the person as having a relatively high near-term risk of suicide in the absence of such parameters from such signal thereby indicating lack of speaker anxiety.

Figure 1A:
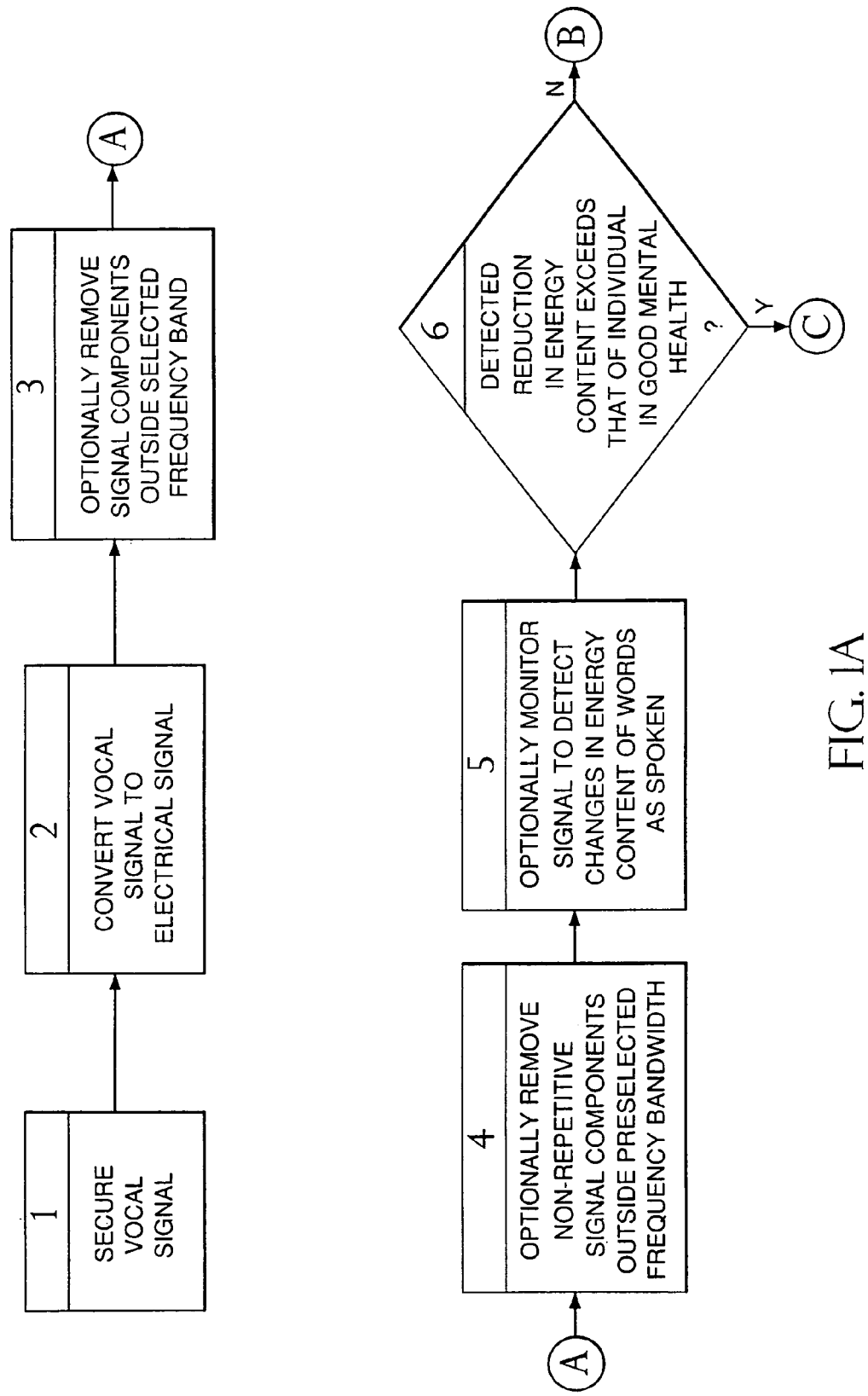
FIGS. 1A, 1B, 1C and 1D together constitute a block diagram in schematic form, illustrating a collection of a series of steps which may be used to practice the invention in its various aspects.
Figure 1B:
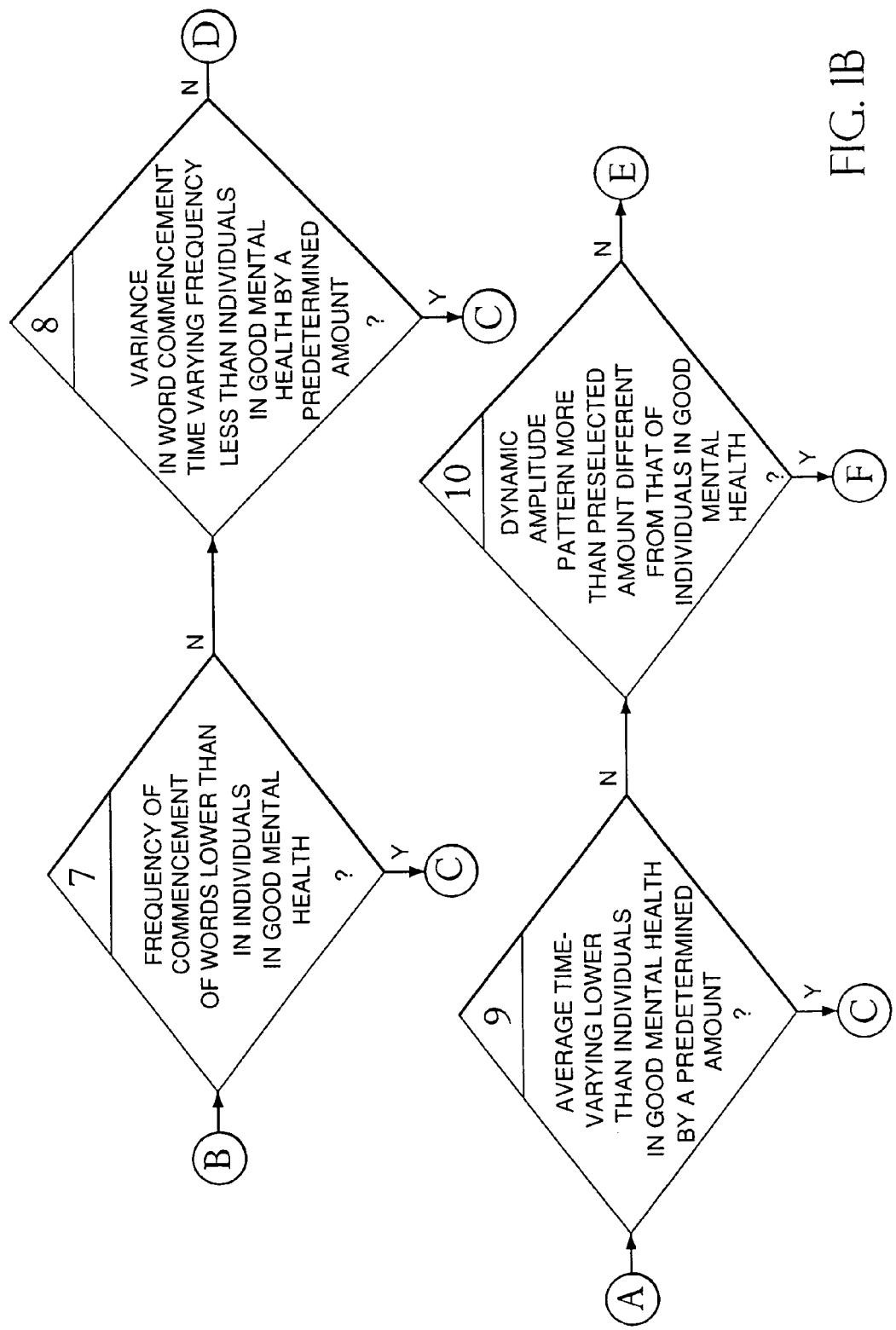
Figure 1C:
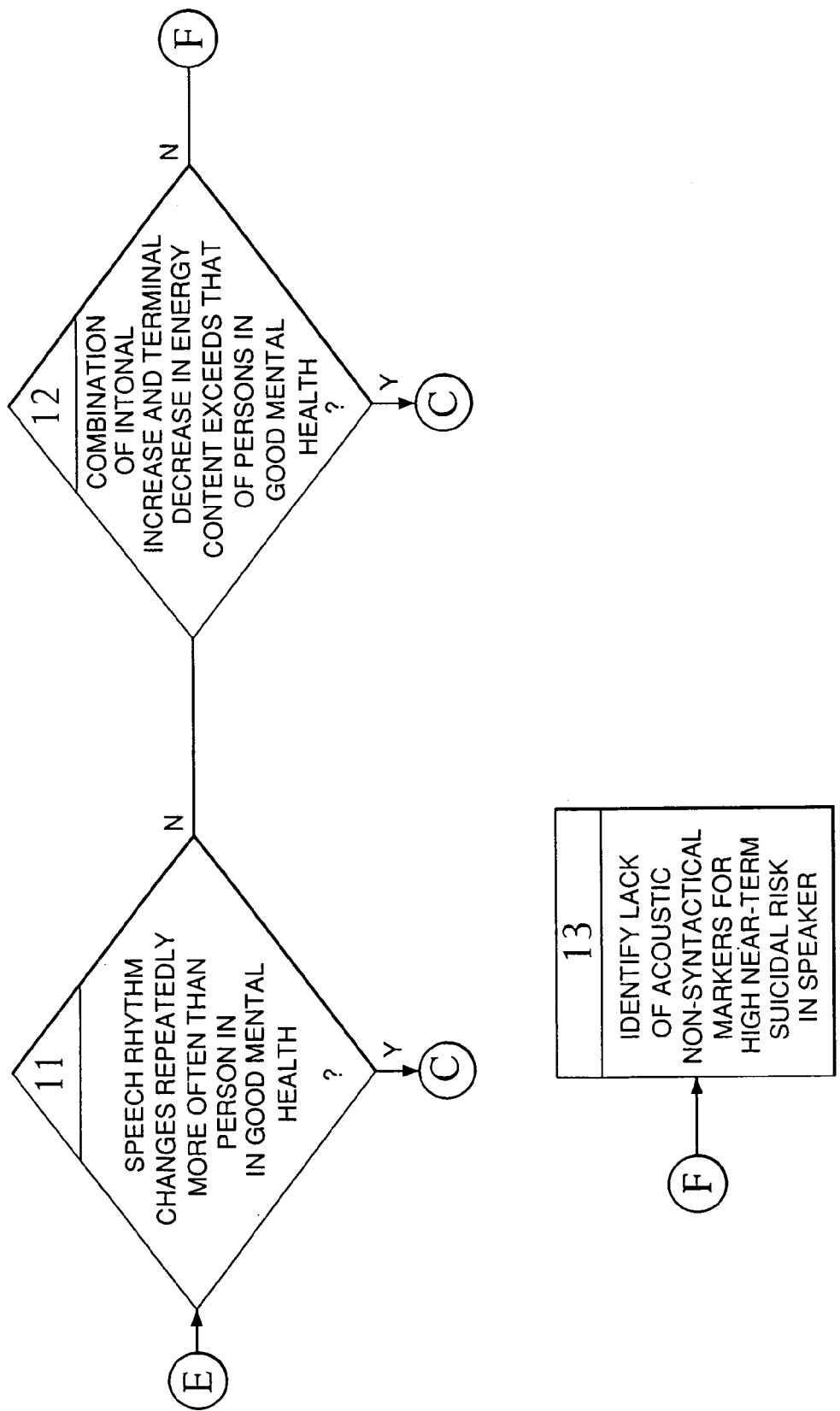
Figure 1D:
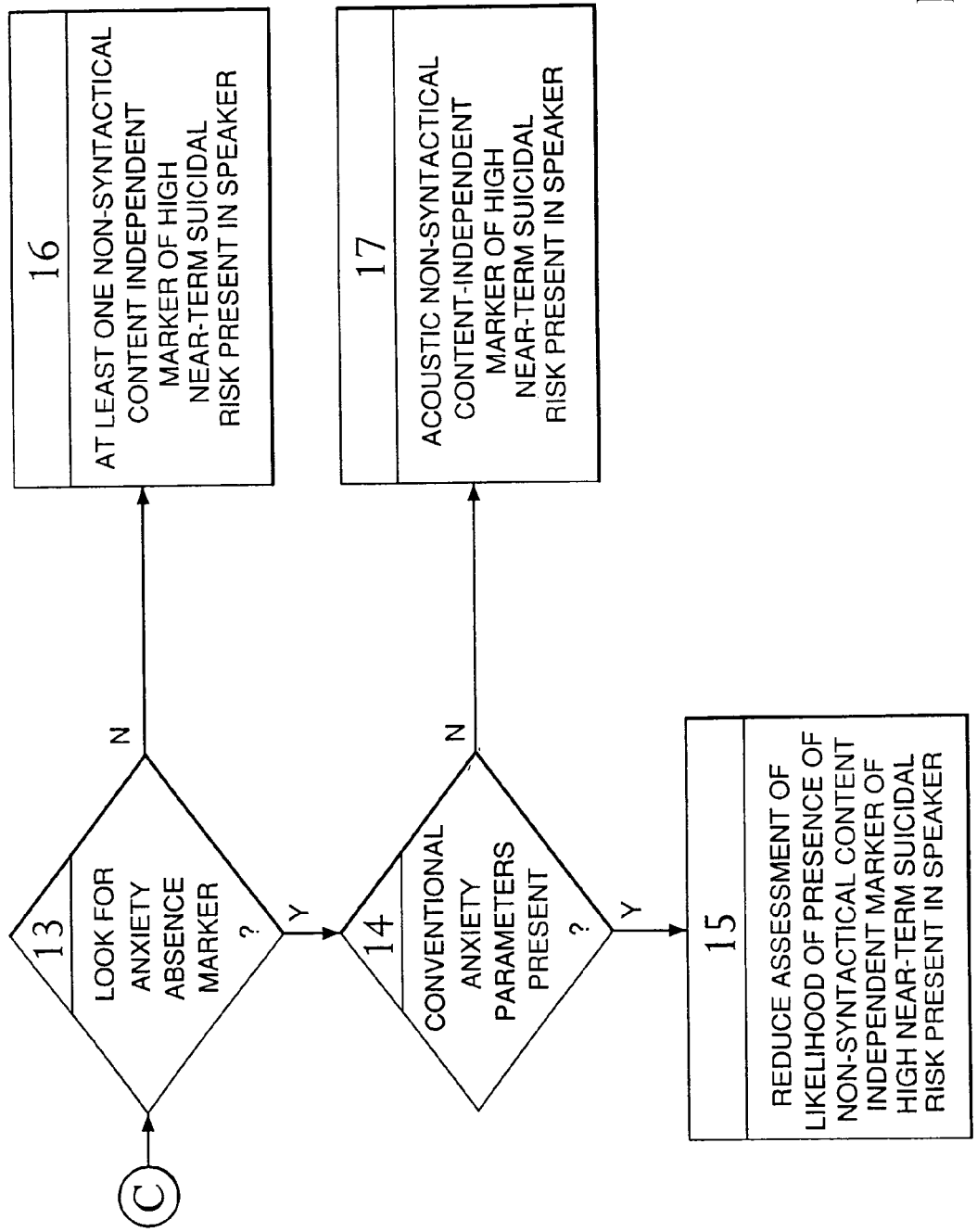

DETAILED DESCRIPTION OF THE INVENTION INCLUDING EXAMPLES AND THE BEST MODE FOR THE PRACTICE OF THE SAME

The disclosures of U.S. Pat. Nos. 4,675,904; 5,148,483 and 5,976,081 are hereby incorporated herein by reference.

In providing methods for evaluating near-term suicidal risk by analysis of spoken words, largely independent of syntactical correctness, the invention utilizes several different criteria indicative of high near-term suicidal risk. One of these criteria is the vocal pattern defined by the spoken words manifesting a distinct loss of energy and power. Another one of these criteria is the vocal pattern defined by the spoken words manifesting unusual regularities in uniformities. A third one of these criteria is the vocal pattern manifesting a hollow, toneless sound. A fourth one of these criteria is the vocal pattern manifesting unexpected accentuation which is syntactically inappropriate or incongruous. This criterion may take the form of an increasing emphasis over the course of words evidencing a maintenance of vocal tension or may take the form of an exaggerated effective burst or exclamation which is abrupt and out of keeping with the ongoing rhythm of the person's speech.

Yet another one of these criteria is the vocal pattern manifesting a distinct ramp-up followed closely by a distinct trail-off.

Another one of these criteria, which is desirably used with one or more of the aforementioned criteria, is the speaker's vocal pattern in a stress-inducing environment manifesting an absence of parameters usually associated with anxiety.

This invention is based and grows out of the discovery that successful prediction of near-term suicidal risk may be based on the sound of the patient's voice, whether or not the patient was talking about suicide. This discovery is consistent with the discomfort often reported by musician/clinicians and by others having a trained listening ear, upon hearing the voices of suicidal patients; the discomfort experienced by the listener is independent of vocal content from the speaker. This discovery is also consistent with cases reported in media documentaries in which authorities were contacted by hotline operators simply on the basis of "something" the operator heard in a caller's voice. When such intuitive calls were investigated by police, the police often discovered suicides in progress. The discovery that there are vocal parameters which are largely independent of content and which when delineated may be used to evaluate near-term suicide risk is the basis for the invention disclosed herein.

This invention embraces identification of the vocal features of speech of highly suicidal persons, in some cases largely if not wholly independent of content, which provide clinical indices of near-term suicidal risk. As time passes, practice of the invention will help to raise the index of suspicion in clinical settings where few effective resources have heretofore been available.

The discoveries on which the instant invention is based grew out of the clinical experience of the inventors involving listening to audio tapes revealing the vocal characteristics of patients over time and in varying clinical states. Patients' vocal qualities were noted during severe regressive episodes, suicidal states and psychotic decompensations. These patients represented a broad diagnostic spectrum and included patients suffering bipolar illness, acute and chronic depression, histrionic character disorders with significant self-destructive behaviors and psychotic character disorders marked by rapid regressive states and equally rapid restitution. The patients included a number with histories of prior suicide attempts and familial histories of suicide.

In the course of the clinical practice, the nature of the patients' illnesses required close monitoring of suicidal risk through increased frequency of sessions and intersession telephone calls. Judgments and clinical decisions were made on the basis of clinical observations and taped vocal qualities recorded outside clinical sittings; both sets of data were charted and documented.

Those patients judged to be at highest risk were hospitalized. Many either made suicide attempts while in the hospital or acknowledged to hospital staff that they had already taken preparatory steps to kill themselves prior to admission. None of the non-hospitalized patients acted on suicidal impulses. Both groups of patients (hospitalized and non-hospitalized) were comprised of individuals who had significant histories of chronic suicidal ideation and expressions of intent.

Data from these cases support the invention. Despite variability in mental health diagnosis, age, sex, history and precipitating circumstances, patients at the greatest near-term risk for suicide were found to exhibit common non-content-related features in their speech. These vocal features were evaluated as one of the decisive factors in assessment of near-term risk. Vocal sound and clinical substance reciprocally augmented each other in the course of clinical judgments.

The clinical experience confirmed that voices of persons at highest near-term risk for suicide demonstrate significant similarities to audiotaped voices of subjects who had completed suicide and subjects who had been taped prior to a potentially lethal attempt.

Data were used not only from applicants' clinical experience but also from suicide survivor organizations furnishing audiotapes of persons who had committed suicide and left suicide notes on tape. Additional data used were from tape libraries, news organizations and police departments. Audio tapes were collected of persons who had committed suicide as well as subjects who survived lethal attempts. The data included subjects who committed suicide at the end of an audiotape. Other data was for subjects either committing suicide or making lethal attempts within minutes, days or, at most, several weeks after the tape recording.

The audiotapes studied included suicide notes left on tapes donated by survivors of failed suicide attempts, suicides recorded on tape, and tapes of hospitalized patients. For example, one subject had left a suicide note on tape outlining (in a flat monologic tone) principles and tenets for his children to live by, but never mentioned suicide. The patient made a suicide attempt two weeks later and was hospitalized. One of the instant patent applicants subsequently consulted the patient in the hospital and, at the patient's request, undertook treatment with the patient consenting to be audiotaped at various intervals.

A number of the hospitalized patients had been taped to expedite record-keeping in emergency situations. These patients gave permission to use their voices and consent to be taped for follow-up purposes.

Prior to processing the tapes, all identifying information was deleted and each tape was assigned a code number.

All tapes used were from suicidal persons recorded in the field under highly variable recording conditions. The tapes represent a unique, rare database of a lethal mindstate which cannot be studied in a laboratory or other controlled setting. The obvious inability to study suicidal behavior in any controlled setting has been one of the most serious obstacles to research regarding near-term suicidal risk prediction.

The subjects were grossly heterogeneous with regard to diagnosis, age, sex and the context of their suicidality. From a heuristic standpoint, however, their commonality and unique homogeneity lay in the fact that they were all in near-term suicidal states. The subjects either completed suicide or made suicidal attempts characterized by use of lethal means and minimal chance of discovery.

For optimal experimental sequencing in construction and evaluation of a diagnostic marker test, in the first phase patients under study should represent obvious cases of the disease of interest in its most typical or severe form. This principle was applied to the study of suicidal states leading to the discoveries underlying the invention.

One step involved in proceeding towards the discoveries underlying the invention included describing vocal characteristics in terms familiar both to musicians or (as persons having highly trained ears) and suicide clinicians, without use of existing scales and descriptors available for the phenomenological study of voice. This maximized the opportunity for fresh perspectives provided by impressions of trained musicians and from suicide clinicians who were also musicians. Psychiatrists, psychologists and musicians described what they heard in selected cases, focusing on vocal qualities rather than content.

The inventive effort initially focused on articulating the phenomenologic impressions of vocal sounds. Acoustic researchers were consulted to formulate hypotheses about the relationship of final descriptors to specific acoustic correlates. Segments of tapes representing the most robust examples of the vocal parameters which had been qualitatively determined as most contributory to the determination of suicidality were selected for spectrographic representation. These descriptors and their acoustic correlates were compared with the acoustic literature on depression and schizophrenia. The literature revealed an extensive bibliography examining hypothesized and putative acoustic correlates of depression, schizophrenia and a variety of neurological disorders. However, this research methodology had not yet been applied to suicidality.

The initial analysis resulted in groupings of vocal qualities distinctive to these tapes and proving to be of value in electrical acoustic analysis.

The initially identified vocal patterns and the associated applied description and qualities included the following:

1. Vocal patterns manifesting loss of energy and power: These were characterized as "little breath support for more than one phrase," "breath that couldn't be sustained," "thin and devitalized sounds," "reliance on head tones," "trail-off," "expiration of breath prior to speaking," "slow and effortful," and "under 60 on the metronome."

2. Vocal patterns manifesting unusual regularities and uniformities in speech: These regularities and uniformities set these voices apart from the flexible, lively voice of the normal person and were characterized as "monotonous melody," "striking the same note repeatedly," "mechanical and repetitious phrasing," "repeated pitch patterns," "uninflected," "little feeling," and "uniformly soft."

3. Vocal patterns manifesting a hollow, toneless sound: These characteristics were the most compelling feature of suicidal voices and were characterized as "lacking a center," "lacking the sounding board represented by the body," "dead," and "as if in a large chamber without an echo." Notably, third party listeners elaborated upon their spontaneous reaction to this sound, which they contemporaneously characterized as being a "nearly empty" hollow sound, by describing the person as being "already gone." This characteristic was heard whether the patient was speaking loudly or softly, quickly or slowly and could be identified even in voices exhibiting somewhat more emotional expression and variability than was typical for the high near-term suicidal risk group. This characteristic hollow sound was heard in those persons believed by applicants to be evidencing pseudo-animation (an "as-if" quality to speech), apparently intended as dialogic but heard as fundamentally monologic.

4. Vocal patterns manifesting unexpected emphasis unrelated to speech syntax: These characteristics were identified as vocal patterns exhibiting a sudden, intermittent increases in emphasis or loudness, which the applicants term "bust-out." What differentiates bust-out from normal speech is that such points of emphasis are unrelated to and incongruous with normal speech syntax and are apparently random. Phonotory expressions prior to and following these bursts of sudden emphasis gave little or no indication that the bursts of emphasis would occur. Applicants further noted that following the burst of sudden or increased emphasis, the subject's speech returned to its previous emphasis characteristics and form, whatever those had been.

Applicants further found that three variants of bust-out emerged with regularity. In the first variant, there was clear incongruence between the emphasis given to a phrase or brief sentence and the meaning of the sentence as a whole. For example, one twenty-four year-old male stated abruptly and with great emphasis completely out of the context of the dialog "My intention was to buy it".

A second variant took the form of an increasing emphasis over the course of several words that did not eventuate in a burst but maintained vocal tension and then returned to what had been observed prior to the burst variant.

In the third variant there was clear incongruence between the emphasis given to a word or exclamation, i.e. an affective burst, and content. The utterance was abrupt and out of keeping with the otherwise ongoing rhythm of the patient's speech.

5. Vocal patterns manifesting a distinct "ramp-up" followed closely by"trail-off": These characteristics were identified as vocal patterns of "loud and then soft", "a sudden drop-off after an initial push," and "attack and depletion." Applicants found that unlike the trail-off described in research on depressed speech as a gradual loss of breath or power, this involved a distinct initial press or effort and more abrupt fall-off, closely resembling bust-out.

6. Vocal patterns in stress-inducing environments which nevertheless manifest absence of parameters usually associated with anxiety. These characteristics were identified as "non-tremulous" vocal patterns. A notable lack of the vocal signs of anxiety emerged as a regular feature over the entire sample of tapes of near-term suicidal risk, in both tapes that were donated and the tapes drawn from the inventors' clinical practices.

Third party consultants to applicants suggested that reduced variations in fundamental frequency, low amplitude modulation and non-instantaneous vocal decay, as disclosed in applicant Dr. Stephen Silverman's prior U.S. Pat. Nos. 4,675,904; 5,148,483 and 5,976,081, might account for patterns 1, 2, and 5. These third party consultants corroborated that bust-out (pattern 4) took the form of bursts of amplitude and power and the absence of anxiety (pattern 6) was reflected by absence of vocal parameters normally exhibited by an individual in a psychological state or situation in which one would expect anxiety.

A specific acoustic correlate for the hollow sound (pattern 3) was initially thought to be reduced variation in fundamental frequency over time and/or the outcome of peculiar regularities and uniformities in speech identified as executing and exhibiting pattern 2. After additional analysis applicants characterized this sound as distinct and qualitatively different from the uniformities in speech characterized as pattern 2. Measures of harmonics, overtones and resonance characteristics of the voice carry the most information for characterizing this hollowness.

In examining vocal parameters of suicidality, applicants found that some shared characteristics with vocal parameters of depression emerged, specifically vocal patterns related to loss of energy or power and vocal patterns related to unusual regularities in speech.

Applicants have found that vocal patterns related to hollowness, unexpected accent, and absence of anxiety (vocal patterns 3 through 6 as identified here) represent the more important parameters for the practice of the invention.

Notably, applicants have found that vocal pattern 3, namely hollowness while superficially similar to the "empty, flat, dull" features in descriptions of depressed voices by researchers, has its own distinguishable qualities as confirmed by third party listeners and apparently has its own distinctive intra-psychic and psychobiological substrate.

In contrast to the hollow, empty sound described as being characteristic of depression without a suicidal component, hollowness in the voice of near-term suicidal patients is acoustically different. It is driven by a different internal state. With regard to the acoustic differences, decrease in harmonics and overtones best accounts for the hollow impression.

Applicants have found that near-term hollowness reflects alterations and losses in the intrapsychic representations of self and external reality. This leads applicants to conclude that profiles of suicidality may show some similarities to schizophrenic vocal features without the deviant prosody, rate, rhythm and metallic voice quality found by prior researchers in schizophrenia.

Many suicidal patients recounting their experiences in the near-term suicidal state reported disturbances in memory, imagery, time sense (cognitive micropsia) and difficulty in visualizing self and others. After a short time, anticipation quickly fades and the patients report ending their psychic existence or "falling into a hole," which are descriptions suggestive of radical disturbances in representation and internal imagery.

This view of near-term suicidal states raises the possibility of losses or changes in the personal vocal signature accompanying the escalation of suicidality.

From a phenomenologic standpoint the listener often responds to the depressed patient as a person suffering an illness. The listener may hear the high-risk near-term suicidal patient as a person who is already dying.

Vocal pattern 4 warrants special attention. Applicants' attempts to understand this phenomenon drew on Scherer's well-known trophotropic model addressing the relative dominance of sympathetic or parasympathetic influence on vocal parameters.

With regard to high risk, near-term suicidal states, applicants believe that these states share some features with the syndrome of mirasmus in infancy which is characterized by a down regulation of biological processes. This state is characterized by diminishing responsivity progressing to a terminal phase. Applicants believe that a massive parasympathetic take-over in some high risk, near-term suicidal states might produce alterations in vocal production, secondary to the parasympathetic effects on muscle tonus and the resultant resonance characteristics of the vocal tract, eventuating in loss of power and decrease in overtone distribution. The bust-out phenomena (pattern 4) reflects sympathetic bursts of activity which are attempts at self-energizing on the part of the patient in an effort to complete the suicidal act.

Clinical experience has shown that during the period just prior to an escalation of near-term suicidal risk, the anxiety or panic which was a prominent part of the illness of a subgroup of patients dropped out or diminished. Tapes drawn from the applicants' practice demonstrate this. Applicants found that the correlational relationships between panic disorder and suicidality do not hold for near-term suicidal risk assessment. Some vocal parameters associated with the patients co-morbid condition (such as anxiety) drop out as their mental state shifts to acting on the suicidal impulse.

The audiotapes used represented a heterogeneous group of patients with regard to age, sex and diagnosis. The vocal patterns delineated cut across these differences. The findings underscore the value of establishing a separate research focus and methodology in order to clarify the state features of suicidality.

In the context of this invention, it is important to note the differences between applicants' findings and those of prior researchers who have succeeded in identifying many vocal parameters common to depressive disorders.

The most robust examples of the pathology under question, namely suicide, were gathered in a naturalistic manner, i.e. patients' suicide notes recorded under highly variable conditions on audiotapes left to be heard after their death. These tapes provide data which is unique and extremely valuable. The next stage of research to further refine the invention should progress from naturalistic to controlled observation where the conditions allow for better audio quality and more precise acoustic analysis, for example in a prepared emergency room setting where patients can be recorded using digital equipment. Parameters can then be correlated with results of clinical examination and/or testing. Should hospitalization prove necessary, patients can be taped over time, thus serving as their own control.

The controlled emergency room situation, contrasted with the naturalistic method utilized to date, may carry with it certain pitfalls. Containment procedures may seriously affect state change and consequent vocal parameters. Patients who voluntarily present themselves for evaluation and treatment may experience some relief and resulting diminished suicidality. Patients who involuntarily present themselves at the emergency room might very well have an unpredictable shift in mental state.

The logic of experimentation as it applies to pathologic states calls for repeated sampling over time with the patients serving as their own controls. This stratagem could provide valuable data, both for the evolving composition of additional vocal parameters and the nature of state-shift change including possible changes in vocal signature. This might be best realized as part of a psychotherapy research protocol.

One fruitful direction of study is change or absence of change in vocal parameters in response to therapeutic intervention during the course of treatment.

During the course of this work, third party colleagues were introduced to these vocal features and taught how to identify the parameters highlighted herein. Those third party colleagues reported that this information played a pivotal role in the timely hospitalizations of patients who, after the fact, acknowledged the seriousness of their suicidal intent. In addition, these third party colleagues expressed an increased sense of comfort in treating patients who chronically expressed suicidal thoughts and ruminations but were no longer considered, based on what was heard, as falling into the category of high near-term suicide risk.

Study of patients in treatment, as in the study of patients in emergency rooms requires an understanding of the impact of setting on suicidality. Many patients, despite increasing suicidal pressure were found to feel sufficiently held within treatment and connected to the therapist. If that contact and connection is disrupted, the patient can demonstrate a dramatic increase in signs of suicidality, including discernible vocal changes such as an increase in monological speech, flatness and detachment in tone. In some suicidal patients the nature of their disorders (such as psychotic character organization) exposes them to recurrent regressive shifts with rapid restitutions. A vocal index of risk during these shifts may be high but not necessarily justify forms of emergency intervention that would be appropriate in other cases.

Optimally, any single risk factor or parameter must be understood in the context of the nature of the external conditions and the special characteristics and course of an individual's illness. Like other measures, a vocal profile contributes to raising the index of suspicion.

The drawing figures illustrate that vocal parameters or patterns 1 through 5 may be used individually or in combination to evaluate near-term suicidal risk. As illustrated in FIG. 1, the more separate or discreet ones of vocal patterns 1 through 5 found in a speaker's voice, the higher the near-term suicidal risk. Vocal pattern 6 may be used with any one or all of vocal patterns 1 through 5 to evaluate near-term suicidal risk; use of vocal pattern 6 desirably increases the accuracy and predictability of the outcome.

Referring to FIG. 1, practice of the invention may commence with the securing of a vocal signal by eliciting the same from a person of interest or recording the same when spoken and volunteered by the speaker such as over a suicide hotline. The vocal signal may also be obtained by passively recording the individual's voice when the individual seeks professional help or speaks to a physician as a part of a routine physical examination such as before issuance of a life insurance policy and the like. Desirably the vocal signal may be of any content; no particular words need be uttered.

The invention desirably proceeds by converting the vocal signal to an electrical signal as indicated in FIG. 1-A, particularly block 2 thereof. The signal is most desirably converted into a digital electrical signal which may be easily processed. Optionally, signal components outside selected frequency bands may be removed to purify this signal as indicated in block 3 of FIG. 1-A. Further optionally, non-repetitive signal components outside pre-selected frequency bandwidth may be removed to further purify the signal as indicated in block 4 in FIG. 1-A. The signal may then optionally be monitored to detect changes in energy content of the words as spoken as indicated in block 5 of FIG. 1-A. A test using the first vocal parameter to determine whether a detected reduction in energy content exceeds that of individuals in good mental health is depicted in box 6 of FIG. 1-A. If the result of that test is positive, as indicated by letter "Y" adjacent to Box 6 in FIG. 1-A, practice of the invention may proceed to balloon C in FIG. 1-D and the speaker may be tested for the absence of an anxiety marker from the speaker's voice. If conventional anxiety marker parameters are not found to be present, this negative leads to the right in FIG. 1-D to the establishment of an acoustic non-syntactical content-independent marker of high near-term suicidal risk being present in the speaker.

Returning to FIG. 1-A, if the detected reduction in energy content did not exceed that of an individual in good mental health, the invention may proceed as indicated by balloon B to test whether the frequency of commencement of words is lower than in individuals in good mental health. In the event that test is positive, the invention may proceed to balloon C, as described above. If the result of that test is negative, the invention may proceed to test for variance in word commencement time varying frequency being less than in individuals in good mental health by a predetermined amount. If the result of that comparison is affirmative, the invention may proceed to balloon C as described above; if the result of that test is negative, the invention may proceed to balloon D and block 9 in FIG. 1-B. Here, average time varying frequency is tested to see if it is lower than for individuals in good mental health by a predetermined amount. If the result of that test is affirmative, the invention may proceed to balloon C as described above; if the results of that test are negative, the invention may proceed to block 10 in FIG. 1-B.

Within block 10, dynamic amplitude pattern is tested to see whether it differs by more than a pre-selected amount from that of individuals in good mental health. If the result of that test is affirmative, the invention may proceed to balloon C as described above. If the result of that test is negative, one may proceed to balloon E leading to decision block 11 in FIG. 1-C. There, speech rhythm is evaluated to see if it changes repeatedly more often than in persons of good mental health. If the result of that test is affirmative, the invention may proceed to balloon C whereas if the result of that test is negative, the invention may proceed to decision block 12 in FIG. 1-C. Within decision block 12, the combination of intonal increase and terminal decrease in energy content exceeding that of persons in good mental health results in proceeding to balloon C as described above. If the result of that is negative, the invention may proceed to balloon F where the speaker is identified as lacking an acoustic non-syntactical marker for high near-term suicidal risk.

In FIG. 1-D, it should be noted that balloon C leading to the test for whether there is no anxiety absence marker calls for a negative result of that test to indicate that at least one non-syntactical content independent marker of high near-term suicidal risk is present in the speaker, as indicated in box 16.

Figure 2A:
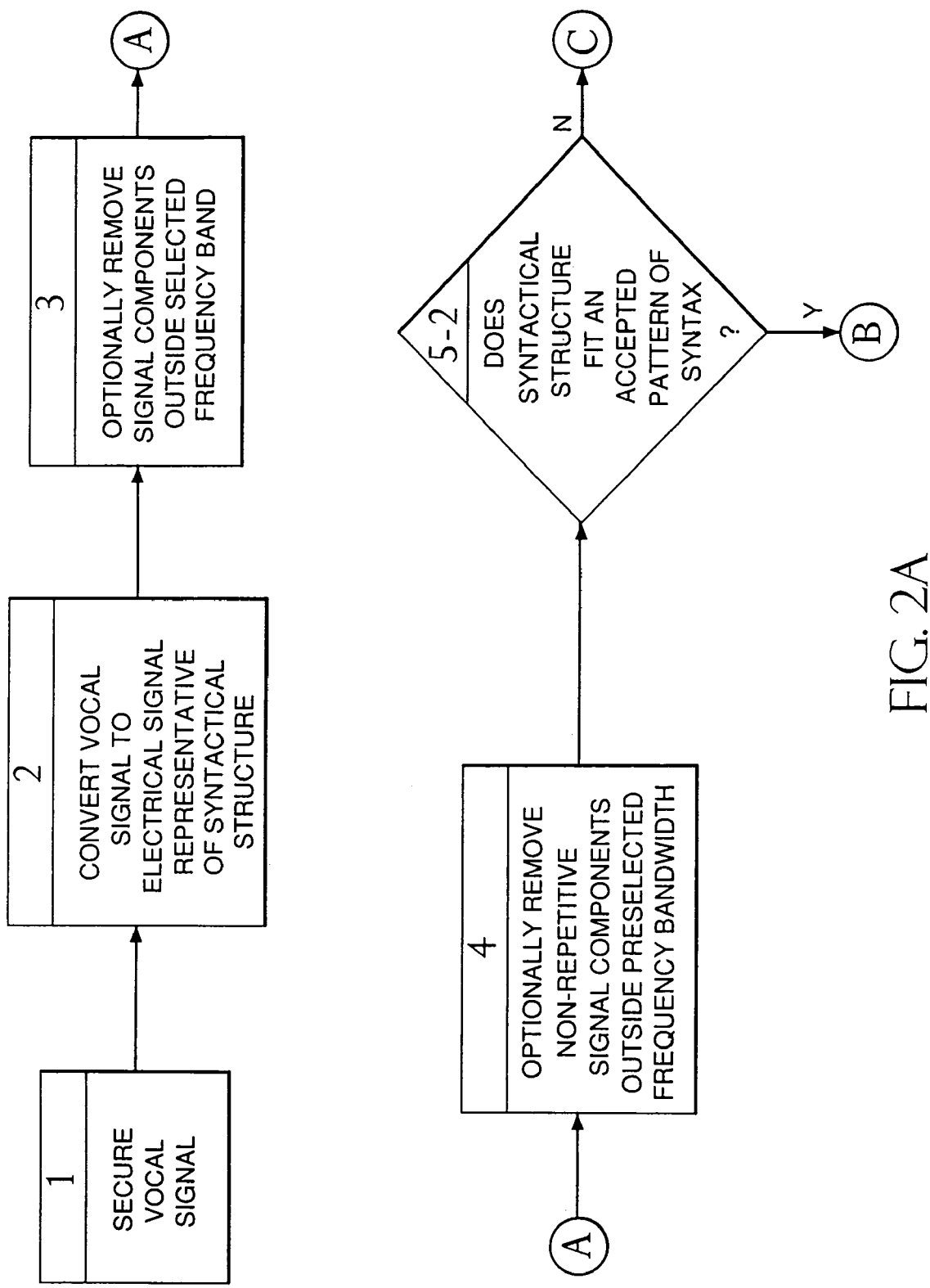
FIGS. 2A and 2B together constitute a second block diagram in schematic form, illustrating a series of steps which may be used to practice the invention in additional ones of the aspects.
Figure 2B:
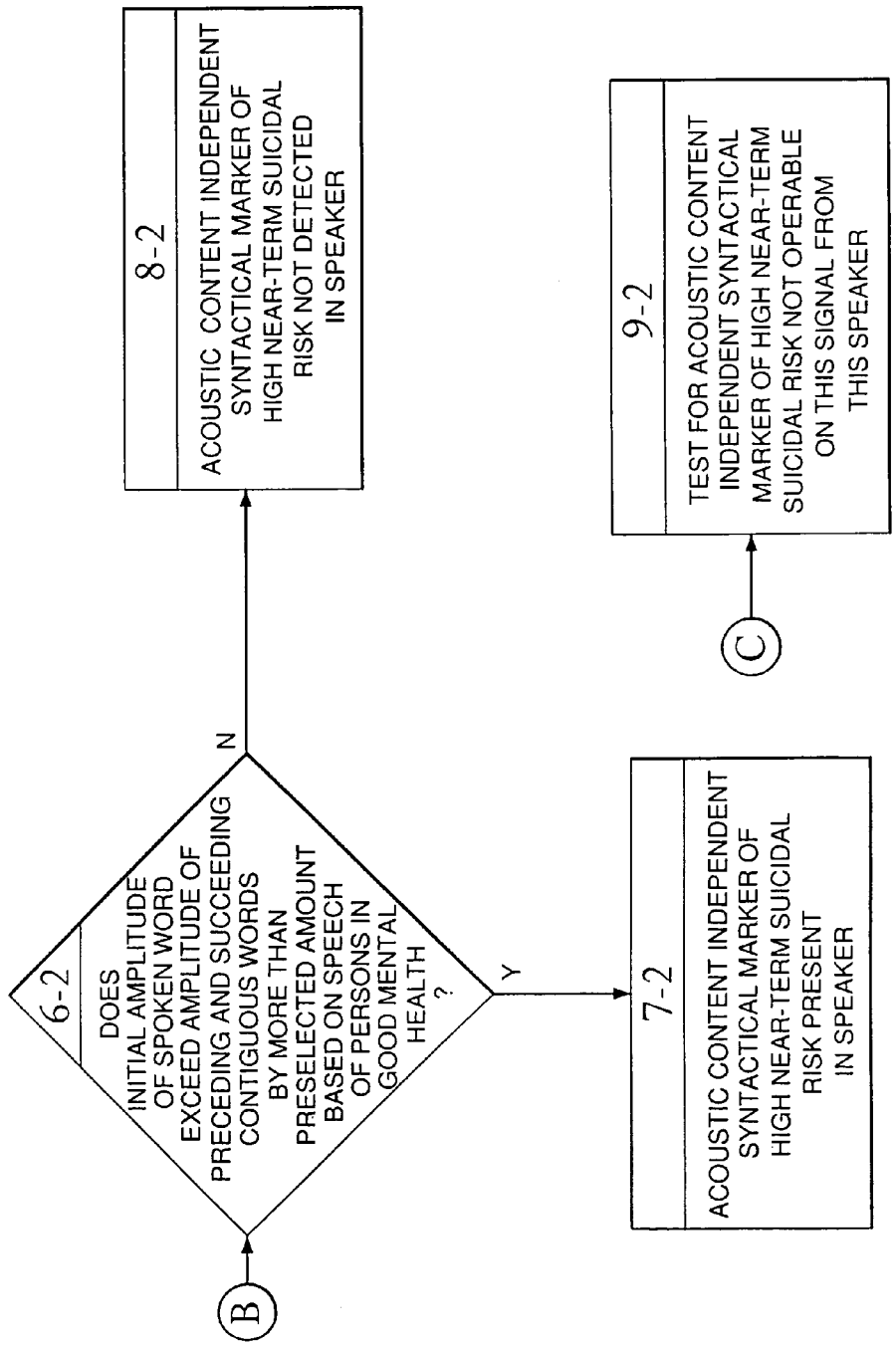

Referring to FIGS. 2-A and 2-B, the first four steps in the practice of this aspect of the invention are the same as those illustrated in FIG. 1. Proceeding to the 5$^{th}$ step, a test is performed to see whether syntactical structure of the electrical signal fits an accepted pattern of syntax. If this inquiry is positive, one proceeds to balloon B and performs the test indicated in decision box 6-2 where it is determined whether initial amplitude of the spoken word exceeds the amplitude of the preceding and succeeding contiguous words by more than a preselected amount based on speech of persons in good mental health. An affirmative answer to this inquiry leads one to conclude, as per box 7-2 that there is an acoustic content independent syntactical marker of high near-term suicidal risk present in the speaker.

However, if the inquiry in box 5-2 found that the syntactical structure did not fit an accepted pattern of syntax leading to balloon C, the conclusion is that the test for an acoustic content independent syntactical marker of high near-term suicidal risk is not operable on the signal from this particular speaker. This is indicated in box 9-2.

Returning to balloon B, if the test on amplitude of spoken word exceeding amplitude of preceding and succeeding contiguous words by more than a preselected amount based on speech of persons in good mental health was negative, this leads one to box 8-2 indicating that an acoustic content independent syntactical marker of high near-term suicidal risk was not detected in this speaker.

The following prophetic examples are provided to demonstrate practice of the invention in its many aspects:

PROPHETIC EXAMPLE 1

A vocal signal including a series of spoken words is secured from a person whose near-term suicidal risk is to be evaluated. The vocal signal is converted into electrical signals having time-varying amplitude indicative of the energy content of the words spoken by the person. Signal components below 200 Hz and above 10,000 Hz are desirably removed. Repetitive signal components having frequencies outside the ninety percent bandwidth of the recorded signal are desirably removed. The resulting electrical signals, representative of the series of spoken words defining the vocal signal, are monitored to dynamically detect changes in the energy content of the series of words as spoken. The speaker is identified as having a relatively high near term risk of suicide if the combination of energy content of the series of words over the course of speaking of the same consistently exceeds that occurring with high probability in the speech of individuals in good mental health having no near-term suicidal risk.

PROPHETIC EXAMPLE 1A

A vocal signal including a series of spoken words is secured from a person whose near-term suicidal risk is to be evaluated. The vocal signal is converted into a corresponding electrical signal having discrete time-varying amplitudes indicative of the energy content of the discrete words spoken by the person. Signal components below 200 Hz and above 10,000 Hz are desirably removed. Repetitive signal components having frequencies outside the ninety percent bandwidth of the recorded signal are desirably removed. The resulting electrical signal, representative of the discrete spoken words collectively defining the vocal signal, is monitored to dynamically detect commencement of words of the series as spoken and the energy content thereof. The speaker is identified as having a relatively high near term risk of suicide if the detected energy content of the words and frequency of commencement of the words are both lower, by predetermined amounts, than the occurrence of same with high probability in the speech of individuals in good mental health having no near-term suicidal risk.

PROPHETIC EXAMPLE 2

A vocal signal including a series of spoken words is secured from a person whose near-term suicidal risk is to be evaluated. The vocal signals defined by the respective words are converted into a respective corresponding electrical signal having discrete time-varying frequency. Signal components below 200 Hz and above 10,000 Hz are desirably removed from each of the respective signals. Repetitive signal components having frequencies outside the ninety percent bandwidth of the recorded signal are desirably removed from each of the respective signals. The resulting electrical signals each representative of spoken words which collectively define the vocal signal, are each monitored to measure time-varying frequency at the commencement of respective ones of those words. The speaker is identified as having a relatively high near term risk of suicide if measured time varying frequency at word commencement varies by less by a predetermined amount than the speech of individuals in good mental health having no near-term suicidal risk.

PROPHETIC EXAMPLE 2A

A vocal signal including a series of spoken words is secured from a person whose near-term suicidal risk is to be evaluated. The vocal signals defined by the respective words are converted into respective corresponding electrical signals having discrete time-varying frequency. Signal components below 200 Hz and above 10,000 Hz are desirably removed from each of the respective signals. Repetitive signal components having frequencies outside the ninety percent bandwidth of the recorded signal are desirably removed from each of the respective signals. The resulting electrical signals each representative of spoken words which collectively define the vocal signals, are each monitored to measure time variations in fundamental frequency at the commencement of respective ones of those words. The speaker is identified as having a relatively high near term risk of suicide if measured word commencement time varying fundamental frequency varies less than a predetermined amount than in the speech of individuals in good mental health having no near-term suicidal risk.

PROPHETIC EXAMPLE 3

A vocal signal including a series of spoken words is secured from a person whose near-term suicidal risk is to be evaluated. The vocal signal is converted into a corresponding electrical signal having discrete time-varying frequency. Signal components below 200 Hz and above 10,000 Hz are desirably removed. Repetitive signal components having frequencies outside the ninety percent bandwidth of the recorded signal are desirably removed. The resulting electrical signal, representative of the series of spoken words defining the vocal signal, is dynamically monitored to measure the time varying frequency thereof. The average value of the time varying frequency is computed. The speaker is identified as having a relatively high near term risk of suicide if the measured average time varying frequency of the signal is lower by a predetermined amount than in the speech of individuals in good mental health having no near-term suicidal risk.

PROPHETIC EXAMPLE 4

A vocal signal including a closely spaced segmental series of spoken words is elicited from a person whose near-term suicidal risk is to be evaluated. The vocal signal is converted desirably into a corresponding electrical signal having at least one time-varying parameter which is indicative of the syntactic structure of the closely spaced segmental series of words spoken by the person. Signal components are desirably filtered, for example by removing components below 200 Hz and above 10,000 Hz. Repetitive signal components may be desirably filtered, for example by removing signal components having frequencies outside the ninety percent bandwidth of the electrical signal. The syntactic structure of the closely spaced segmental series of words predetermined by this at least one time-varying parameter of the electrical signal is compared with known patterns of recorded syntax to identify whether some or all of the syntax of the spoken words fits a grammatically accepted pattern. If a close match is found with a grammatically accepted pattern, the initial amplitudes of spoken words identified as fitting the grammatically accepted pattern are compared with normalized amplitudes of preceding and succeeding contiguous words spoken by the person. The speaker is identified as having a relatively high near-term risk of suicide if the initial amplitude of the spoken word exceeds amplitude of the preceding and/or succeeding contiguous words by more than a measured amount based on speech of individuals in good mental health having no near-term suicidal risk.

PROPHETIC EXAMPLE 4A

A vocal signal including a series of spoken words is secured from a person whose near-term suicidal risk is to be evaluated. The vocal signal is converted into a corresponding desirably electrical signal having amplitudes indicative of the vocal signal. Signal components below 200 Hz and above 10,000 Hz may desirably be removed. Repetitive signal components having frequencies outside the ninety percent bandwith of the recorded signal may desirably be removed. The resulting electrical signal, representative of the spoken words collectively defining the vocal signal is repeatedly dynamically monitored to detect amplitude increases over the course of several words followed by a return to amplitude level prior to the detected amplitude increase, to define a dynamic amplitude pattern. The speaker is identified as having a relatively high near term risk of suicide if the detected dynamic amplitude pattern of the words differs by more than a predetermined amount from the dynamic amplitude patterns exhibited by the speech of individuals in good mental health having no near-term suicidal risk.

PROPHETIC EXAMPLE 4B

A vocal signal including a series of spoken words in secured from a person whose near-term suicidal risk is to be evaluated. The vocal signal is converted into a corresponding electrical signal having at least one time-varying amplitude parameter indicative of the rhythmic structure of the words spoken by the person. The signal may be filtered; for example components below 200 Hz and above 10,000 Hz may desirably be removed. The resulting electrical signal, having at least one time-varying parameter indicative of the rhythmic structure of the series of spoken defining the vocal signal, is dynamically monitored to detect changes in the rhythm of the speech of the person followed by a return to the pre-existing rhythmic structure of the person's speech. The speaker is identified as having a relatively high near term risk of suicide if the detected changes in speech rhythm repeatedly occur more often than in the speech of individuals in good mental health having no near-term suicidal risk.

PROPHETIC EXAMPLE 5

A vocal signal including a series of spoken words is secured from a person whose near-term suicidal risk is to be evaluated. The vocal signals are converted into corresponding electrical signals having time-varying amplitude indicative of the energy content of the words spoken by the person. Signal components below 200 Hz and above 10,000 Hz are desirably removed. Repetitive signal components having frequencies outside the ninety percent bandwidth of the recorded signal are desirably removed. The resulting electrical signals, representative of the series of spoken words defining the vocal signal, is graphically displayed, and monitored to dynamically detect changes in the energy content of the words as spoken. Intonal and terminal changes in signal energy content for each word or series of words are noted and measured. The speaker is identified as having a relatively high near term risk of suicide if the combination of a detected increase in intonal energy content and a detected decrease in terminating energy content of the words consistently exceeds that occurring with high probability in the speech of individuals in good mental health having no near-term suicidal risk.

The following is claimed:

1. A method for evaluating near-term suicidal risk by analysis of a series of spoken words, comprising the steps of:

a. converting the spoken series of words into a signal having time varying amplitude indicative of energy content of said words spoken;
b. dynamically monitoring said signal to detect changes in energy content of said words as spoken;
c. indentifying the person as having a relatively high near-term risk of sucide if detected reduction in energy content of said series of words over the course of speaking of the same exceeds that occurring in the speech of individuals in good mental health having no near-term suicidal risk.

2. The method of claim 1 further comprising the steps of:
a) dynamically monitoring said signal to detect presence therein of parameters conventionally indicating anxiety in the speaker; and
b) identifying the person as having a relatively high near-term risk of suicide in the absence of such parameters from such signal thereby indicating lack of speaker anxiety.

3. A method for evaluating near-term suicidal risk by analysis of spoken words by an emotionally agitated and/or depressed person, comprising the steps of:
a) converting spoken series of words into a signal indicative of the amplitude thereof;
b) repeatedly dynamically monitoring said amplitude represented by said signal to detect amplitude increases over the course of several words followed by a return to the amplitude level prior to the detected amplitude increase to define a dynamic amplitude pattern;
c) indentifying the person as having a relatively high near-term risk of suicide if dynamic amplitude pattern differs by more than a preselected amount from the dynamic amplitude patterns of indiviuals in good mental health having no near-term suicidal risk.

4. The method of claim 3 further comprising the steps of:
a) dynamically monitoring said signal to detect presence therein of parameters conventionally indicating anxiety in the speaker; and
b) indentifying the person as having a relatively high near-term risk of suicide in the absence of such parameters from such signal thereby indicating lack of speaker anxiety.

5. A method for evaluating near-term suicidal risk by analysis of series of spoken words, comprising the steps of:
a) converting the spoken series of words into a signal indicative of the rhythmic structure thereof;
b) dynamically monitoring said signal to detected changes in the rhythm of the speech of said person followed by a return to the determined rhythmic structure;
c) identifying the person as having a relatively high near-term risk of suicide if detected changes in speech rhythm of the person repeatedly occur more often than in speech of individuals in good mental health having no near-term suicidal risk.

6. The method of claim 5 further comprising the steps of:
a) dynamically monitoring said signal to detect presence therein of parameters conventionally indicating anxiety in the speaker; and
b) indentifying the person as having a relatively high near-term risk of suicide in the absence of such parameters from such signal thereby indicating lack of speaker anxiety.

7. A method for evaluating near-term suicidal risk by analysis of a series of spoken words, comprising the steps of:
a) converting the spoken series of words into a signal having time varying amplitude indicative of energy content of said words as spoken;
b) dynamically monitoring said signal to detect changes in energy content of said words as spoken;
c) identifying the person as having a relatively high near-term risk of suicide if combination of detected intonal increase in energy content and terminal decrease in energy content of said words exceeds that occurring in the speech of individuals in good mental health having no near-term suicidal risk.

* * * * *